US009531694B2

(12) United States Patent
Alt

(10) Patent No.: US 9,531,694 B2
(45) Date of Patent: Dec. 27, 2016

(54) INTELLIGENT DELIVERY SYSTEM

(71) Applicant: GLS IT SERVICES GMBH, Neuenstein (DE)

(72) Inventor: Jochen Alt, Karlsbad (DE)

(73) Assignee: GLS IT SERVICES GMBH, Neuenstein (DE)

( * ) Notice: Subject to any disclaimer, the term of this patent is extended or adjusted under 35 U.S.C. 154(b) by 126 days.

(21) Appl. No.: 14/592,924

(22) Filed: Jan. 9, 2015

(65) Prior Publication Data

US 2016/0050191 A1 Feb. 18, 2016

(30) Foreign Application Priority Data

Aug. 12, 2014 (DE) ........................ 10 2014 111 503

(51) Int. Cl.
*H04L 15/06* (2006.01)
*H04L 29/06* (2006.01)
*G07C 9/00* (2006.01)

(52) U.S. Cl.
CPC ......... *H04L 63/067* (2013.01); *G07C 9/00896* (2013.01); *H04L 63/061* (2013.01); *H04L 63/0853* (2013.01); *H04L 63/18* (2013.01); *G07C 9/00571* (2013.01)

(58) Field of Classification Search
USPC ....................... 726/4, 24; 713/155, 176, 182
See application file for complete search history.

(56) References Cited

U.S. PATENT DOCUMENTS

| 6,839,670 | B1* | 1/2005 | Stammler | ............. | G10L 15/063 |
| | | | | | 704/251 |
| 6,959,090 | B1* | 10/2005 | Alve | ...................... | H04N 5/913 |
| | | | | | 348/E5.007 |
| 8,261,979 | B2* | 9/2012 | Gressel | .................. | G06Q 10/02 |
| | | | | | 235/375 |
| 8,998,077 | B2* | 4/2015 | Wong | ................. | G07D 11/0057 |
| | | | | | 235/375 |
| 2002/0178016 | A1 | 11/2002 | McLellan | | |
| 2002/0178385 | A1 | 11/2002 | Dent et al. | | |

(Continued)

FOREIGN PATENT DOCUMENTS

| DE | 100 54 633 A1 | 4/2002 |
| DE | 101 64 574 A1 | 4/2004 |

(Continued)

*Primary Examiner* — Sayed Beheshti Shirazi
(74) *Attorney, Agent, or Firm* — Norman B. Thot

(57) ABSTRACT

An access control system includes a plurality of containers. Each container comprises a container identification feature, an interior space, a locking device which can be selectively released to access the interior space, and a security module. The security module comprises an authorization module, and a security key generator which generates a security key. An authorization key supply device comprises a storage device and a communication module which directly or indirectly supplies an authorization key to the authorization module. A remote computer system comprises an authorization key generator. The remote computer system communicates with the authorization key supply device to transmit the authorization key thereto. The authorization module compares the security key with the authorization key and generates a signal to release the locking device if the security key matches the authorization key.

6 Claims, 5 Drawing Sheets

(56) References Cited

U.S. PATENT DOCUMENTS

| | | |
|---|---|---|
| 2002/0180582 A1 | 12/2002 | Nielsen |
| 2005/0049746 A1* | 3/2005 | Rosenblum ......... G06F 19/3462 700/232 |
| 2005/0195975 A1* | 9/2005 | Kawakita .............. H04L 9/0822 380/30 |
| 2007/0203727 A1* | 8/2007 | Moore ................... A45C 15/00 705/500 |
| 2007/0247277 A1 | 10/2007 | Murchison et al. |
| 2009/0101711 A1 | 4/2009 | Grayson |
| 2009/0300366 A1* | 12/2009 | Gueller ................... G06F 21/51 713/189 |
| 2010/0294834 A1* | 11/2010 | Wong ................. G07D 11/0057 235/379 |
| 2011/0321146 A1* | 12/2011 | Vernon ................... G06F 21/35 726/7 |
| 2012/0018512 A1* | 1/2012 | Gressel ................. G06Q 10/02 235/382 |
| 2013/0043973 A1 | 2/2013 | Greisen et al. |
| 2015/0119019 A1 | 4/2015 | Minichmayr |
| 2016/0050191 A1* | 2/2016 | Alt ........................ H04L 63/061 726/4 |

FOREIGN PATENT DOCUMENTS

| | | |
|---|---|---|
| EP | 2 320 388 A1 | 5/2011 |
| WO | WO 02/095699 A1 | 11/2002 |
| WO | WO 2013/181682 A1 | 12/2013 |

\* cited by examiner

INTELLIGENT DELIVERY SYSTEM

CROSS REFERENCE TO PRIOR APPLICATIONS

Priority is claimed to German Patent Application No. DE 10 2014 111 503.1, filed Aug. 12, 2014. The entire disclosure of said application is incorporated by reference herein.

FIELD

The present invention relates to an intelligent delivery system and to an associated method. The present invention relates, in particular, to a delivery system and to an associated method whereby the access security to a stationary container can be optimized while the durability of the components of the system is at the same time improved.

BACKGROUND

Delivery systems that utilize containers of a stationary design and that are linked to a delivery address have previously been described. Providers of delivery services can use such containers for the secure delivery of consignments of any kind. The container is therefore provided with a locking means that can be released by the owner of the container as well as the by provider of the delivery service in order to gain access to the interior of the container.

Mechanical systems for allowing access to the interior of the container are uncomfortable, which has in the past prompted the development of electronically supported systems offering better usability that are superior to the mechanical solution. However, these systems suffer from numerous disadvantages that compromise the security of the delivery system and allow only for limited practical usability.

SUMMARY

An aspect of the present invention is to provide an access control system that improves security during use while simultaneously facilitating optimized usability. A further aspect of the present invention is to provide an associated method for operating the access control system.

In an embodiment, the present invention provides an access control system which includes a plurality of stationary containers. Each stationary container comprises a container identification feature, an interior space, a locking device configured to be selectively released so as to facilitate an access to the interior space, and a stationary security module arranged inside the stationary container. The stationary security module comprises an authorization module, and a security key generator configured to generate a security key. A mobile authorization key supply device comprises a storage device and a communication module. The communication module is configured to directly or indirectly supply an authorization key to the authorization module. A remote computer system comprises an authorization key generator. The remote computer system is configured to communicate with the mobile authorization key supply device so as to transmit the authorization key to the mobile authorization key supply device. The authorization module is configured to compare the security key with the authorization key and to generate a signal to release the locking device if a match between the security key and the authorization key is determined. The mobile authorization key supply device is configured to be operated in an online mode where a communication between the authorization key supply device and the remote computer system is presumed ensured, and an offline mode where the communication between the authorization key supply device and the remote computer system is not ensured. A communication feature is linked to each container identification feature. The communication feature is configured to selectively preset the online mode or the offline mode for the stationary container which corresponds to the container identification feature.

BRIEF DESCRIPTION OF THE DRAWINGS

The present invention is described in greater detail below on the basis of embodiments and of the drawings in which.

DETAILED DESCRIPTION

Figure 1:
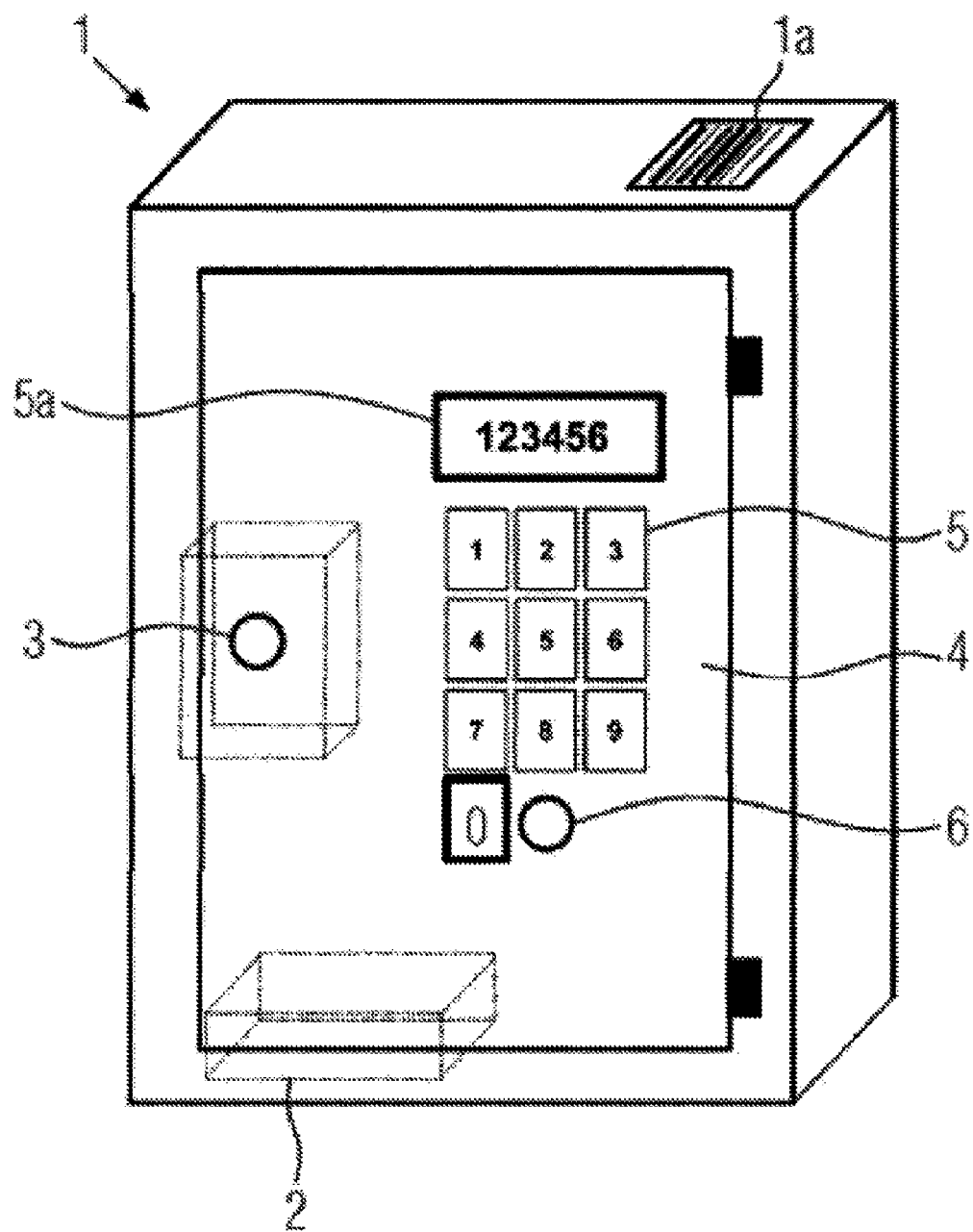
FIG. 1 shows a container as an element of the access control system.

In an embodiment of the present invention, the access control system includes the following elements:

A plurality of stationary containers, each having a locking means that can be selectively released to allow access to the interior of the respective container, and wherein each of the stationary containers is assigned a container identification feature;

a stationary security module within the respective container, having a security key generator and an authorization module;

a mobile authorization key supply means having a storage means and a communication module for the direct or indirect supply of an authorization key to an authorization module;

wherein the authorization module is set up for comparing the security key that was generated by the security key generator to the authorization key that was supplied by the authorization key supply means and for generating a signal by which the locking means is released, if a match of the same is found;

further having a remote computer system that is provided with an authorization key generator and that is at least temporarily able to communicate with the authorization key supply means for transmitting the authorization keys to the authorization supply means.

According to the present invention, the authorization supply means can be selectively operated between an online mode, where the communication between the authorization key supply means and the remote computer system is assumed as being ensured, and an offline mode, where the communication between the authorization key supply means and the remote computer system is not ensured, wherein a communication feature is linked to each container identification feature that selectively presets the online mode or the offline mode for the stationary container that corresponds to the container identification feature.

In an embodiment of the present invention, the access control system is provided with a container that can be unlocked. In the released state of the container, access to the interior of the container is facilitated, whereby it is possible to deposit consignments inside the container, or whereby it is possible to remove consignments that were deposited inside the container prior to the release action. The access control system is based on a comparison of keys, wherein the comparison can, for example, occur inside the authorization module. The authorization module therein generates a security key with the aid of the security key generator and compares this security key to the supplied authorization key. The authorization key therein is presented at the container; it is in particular entered or transmitted otherwise. The provider of the delivery services and/or a person authorized accordingly by the provider typically handles the presentation. Said person is, for example, in the vicinity or at least in the environs of the container.

An authorization key supply means is used therefor that is designed, as provided according to the present invention, as a mobile device and can be used by the provider of the delivery service.

In an embodiment of the present invention, the authorization key supply means includes an option for communicating with a remote computer system. The present invention envisions that any authorization keys are generated with the aid of an authorization key generator.

The authorization keys and/or security keys can be generated in any which way or manner. It is possible to implement a time-based generation modality for the authorization keys and securities keys, whereby these same keys are generated in a time-synchronized fashion with the security key generator and the authorization key generator, and wherein the authorization key is made available at the authorization key supply means.

Generating the keys not, however, be done in time-based fashion, any modality is possible. The key can, for example, be calculated or identified by a remote computer means, based on alternating information, such as a numerical sequence, that is output by the container.

In an embodiment of the present invention, the authorization key generator is assigned to the remote computer system. The authorization key generator can, for example, be designed as a program module that generates a single or multiple authorization keys upon request. The generation of the authorization keys in the authorization key generator typically takes place knowing the specific container, whereby a single or multiple authorization keys are generated by the authorization key generator for each specific container. The security key generator generates a security key that should correspond to the generated authorization key at least temporarily and under predetermined conditions. The system furthermore includes the authorization module that implements a comparison between the security key and the presented authorization key. This comparison is used to determine whether a signal is to be generated to release the locking means.

The core idea of the present invention envisions generating the authorization keys using the authorization key generator outside of the authorization key supply means. According to the present invention, in this context, the authorization key supply means is provided with a function allowing it to communicate with the remote computer system. As provided according to the present invention, the authorization key supply means can be selectively operated in an online mode or an offline mode. The online mode therein denotes that a communication line, particularly a data connection or other type of connection, is provided between the authorization key supply means and the remote computer system, or that establishing the same is at least possible. The offline mode therein denotes that any such communication between the authorization key supply means and the remote computer system is not possible, or that the same is at least not provided. As to whether or not a communication is provided between the authorization key supply means and the remote computer system can be derived therein from the technical prerequisites for the communication. The technical prerequisites therein can comprise the availability of a wireless connection, such as, for example, via the wireless network but without being limited thereto.

The system can, for example, utilize a plurality of stationary containers, wherein each of the containers is assigned a container identification feature. This can be any kind of identification feature, such as, for example, a bar code, alphanumeric information, or encryption, which can be read by utilizing a predetermined means. The container identification features are, for example, disposed on, to, or in the vicinity of the containers themselves. The container identification feature can be combined with further features of the related container, such as, in particular, location features and the like. In this case, the container identification feature can be designed in a simplified manner, and the assignment between the container identification feature and the corresponding container does not need to be unique.

The stationary security module can, for example, for reasons of security, be disposed within the respective container, whereby any unauthorized access to the security module is precluded, when the container is locked. The security module can be further secured, for example, by a mold-type arrangement, whereby any access to the structural elements of the security module is impossible without also destroying the module.

The mobile authorization key supply means can be designed as a handheld device, i.e., as a portable unit, that includes an input interface, for example, a keyboard, an output interface, for example, a monitor, and other communications means, such as, in particular, a communication interface for creating a connection with the remote computer system. It is also possible to provide read-in devices that can be used for reading in the container identification features. It is also possible to provide a communications interface serving for the presentation of the authorization key to the security module. The use of a wireless connection is possible therefor, for example, to create a communication between the security module and the authorization key supply means. This connection can, for example, be a near-field connection that is only able to communicate within a predetermined area distance between the authorization key supply means and the container.

The authorization key supply means further includes a storage means where different data can be saved.

In an embodiment of the present invention, those authorization keys that are linked with a container identification feature, which, as a communication feature, presets the offline mode, can, for example, be deposited in advance in the storage device of the authorization key supply means; they are retrieved from the storage means, when the container identification feature is entered.

This is, however, predicated on the fact that any communication between the authorization key supply means and the related container is not provided, or that it is impossible. This information can, for example, be determined in advance, whereby it is possible to assign a communication feature to the container identification feature in advance that can preset in the offline mode, when the connection between the authorization key supply means and the remote computer system is not provided, or is impossible.

According to an embodiment of the present invention, those authorization keys that are linked with a container identification feature, which presets the online mode, can, for example, be transmitted from the remote computer system to the authorization key supply mean, when the container identification feature is entered.

The communication feature that is linked with the container identification feature can therefore preset either the online mode or the offline mode. When the communication feature presets the online mode, this means that a communication between the authorization key supply means and the remote computer system is deemed ensured, or it is in fact ensured. The transmission of an authorization key that is generated by the authorization key generator, which is located in the remote computer system, can also be supplied to the authorization key supply means when the corresponding request is made. In the present context, this request is at least the input of the container identification feature, such that the authorization key supply means of a single or of multiple authorization keys is supplied via the communication between the authorization key supply means and the remote computer system, which can, in turn, be supplied to the authorization module of the security module. As described previously for the offline mode, a comparison is made between the security key that was generated by the security key generator and the authorization key, which is made available upon request for the authorization key supply means.

The system according to the present invention therefore encompasses two technically completely independent functionalities. On the one hand, the access control system can be operated with optimum security, provided the online mode is available, because the authorization keys are generated on the remote computer system and made available for the authorization key supply means only upon a corresponding request. Any storage or otherwise preparation of those authorization keys, which have the online mode assigned to them, is thus not required. Security is correspondingly increased because, should the authorization key supply means be lost or become subjected to tampering, no authorization key is made available to the unauthorized user.

To allow for the usability of the access control system also in regional areas where the online mode is not available, the same system can still be utilized with the same ease of application, in that the authorization keys, which have the offline mode assigned thereto, are deposited in advance in the storage means of the authorization key supply means. The basic advantage of the present invention is therefore characterized by the fact that the advantages of the online mode can be utilized to increase the security to a maximum, while the same system can be used with an acceptable level of security in the context of an application that is approximately unchanged even in the offline mode.

In an embodiment of the present invention, a one-time key can, for example, be preset for the security key generator, wherein the authorization module is set up so that it compares the preset one-time key to a supplied one-time authorization key and generates a signal to release the locking device if a match is found.

The property of the one-time key is differentiated from that of the general authorization key. The locking means can in particular, for example, only be unlocked after the release of the locking means following the input of the one-time authorization key that matches the one-time key. The one-time key can, for example, be preset by the user or by other users of the container and forwarded to the provider of the delivery service. The one-time key therein can, for example, be freely selected and can be input, in particular manually, into the authorization module of the security module. The one-time key can alternatively be generated upon request by the security module and presented to the owner of the container. As soon as a one-time key has been preset and/or activated and the container locked as a consequence or, in this context, at this point, any further access to the interior of the container is only possible upon input of the one-time key because other keys and/or authorization keys will not result in the release of the locking means. The authorization module of the security module is set up with corresponding modules therefor. The special application allows for the deposit of valuable and/or sensitive consignments or items inside the container and for preventing any granting of access to the container and/or the valuable and/or sensitive content when the system is in use by various providers of the delivery service.

Due to the fact that the owner knows the one-time key of the container, access to the interior of the container can be granted at any time when the owner enters the one-time key in the authorization module of the security module. The one-time key that is available to the owner based on the previously described procedure can, for example, be directly or indirectly supplied to the provider of the delivery service, for example, via an online portal. The one-time key can alternatively be supplied to the provider of the delivery service via other modalities, for example, by phone or postal service. After the one-time authorization key, which should correspond to the one-time key, was entered into the authorization module of the security module in order to release the locking means, the system is ready once again for the use of other authorization keys, in particular by way of any parallel utilization by different providers of the delivery service.

It is also possible to assign the one-time key with a limited period of validity, such that, for example, the validity of the one-time authorization key lapses after one day. In this case, either a new one-time authorization key must be generated or preset, or the process must be aborted.

In an embodiment of the present invention, it is possible, for example, to preset a permanent key for the security key generator, wherein the authorization module is set up to compare the prescribed permanent key with a supplied permanent authorization key, wherein, if a match is found and if the authorization module determines that the locking means is not locked by a one-time authorization key, a signal for the release of the locking means is generated. The permanent authorization key has functions that deviate from the general authorization key. The permanent authorization key is in particular not generated on a time basis. However, it is also possible to prescribe a predetermined period of validity for the permanent authorization key, that is, however, considerably higher than that of the general authorization key.

The permanent authorization key is furthermore a static key that is essentially permanently available in the authorization module of the security module, at least during the specified period of validity. The permanent authorization key is used to provide an option by which the locking means of the container can be released at any point in time via the permanent authorization key being entered in the authorization module of the security module and compared to the permanent authorization key that is preset or available. The authorization module of the security module is set up with the corresponding modules therefor.

It is also possible to provide access to the container to other persons who are not the owner of the container, for example, neighbors, in order to achieve a further improvement in the comfort of use of the system. It is possible to impose restrictions on the use of the permanent authorization key, for example, limitations that are specified on a time basis or on the basis of the content of the container.

In an embodiment of the present invention, also provided is a module for determining the load state of the container, wherein the authorization module can, for example, be set up to compare a master authorization key, which can be preset, to a master security key, which is supplied to the authorization module, and to generate a signal to release the locking means if a match is found between the two, if the module for detecting the load state determines that the container is not loaded.

Due to the fact that the system is linked to a database that can be at least in part deposited and evaluated on the remote computer system, the remote computer system can have knowledge of the load state of the container. In particular, while the access control system is in use, the remote computer system is notified as to whether a consignment has been deposited in the container. This can be accomplished, in particular, with the assistance of the authorization key supply means that saves information regarding the load state, or, if a communication connection exists, said information is supplied to the remote computer system, or said information is supplied to the remote computer system directly. It is, however, sufficient if the information regarding the load state of the container is available for the authorization module.

The master authorization key has properties that differ from those of the general authorization key. The master authorization key is assigned a mean period of validity, for example, one day. The security of use of the master authorization key is therefore restricted. However, the access control system provides that the release of the locking means only occurs following the input of a master authorization key that matches the master key which is available for the security module, when the container is empty. No material losses are therefore expected to occur if the master authorization key itself and/or the authorization delivery means, where the master authorization key is deposited, should occur.

The master authorization key can be blocked, for example by means of the use of an online portal. The master key, which is available for the authorization module of the security module, must therefore also be deleted, blocked or updated. It is possible to execute a predetermined functionality of the access control system on the input means of the container.

In an embodiment of the present invention, at least the authorization key and the security key can, for example, be generated on a time basis. Time-based generation means that time influences the generation of the authorization key and the security key. It is in particular possible to use the real time in the security module that is preset by a real-time clock and elapses simultaneously inside the authorization key generator essentially in a synchronized fashion. A DCF77 module, which is able to receive highly precise real-time information by way of a radio signal, can be used for the authorization key generator and/or the security key generator. However, instead of the real time, is also possible to use a virtual time that is synchronized by means of technical measures inside the security module and the authorization key generator. The time-based generation can in particular comprise a sequential generation of authorization keys and security keys at predetermined intervals. It is possible, for example, for a new security key to be generated inside the security module every 60 seconds, while, using the same time base, a new authorization key is generated in the authorization key generator. Based on the time-synchronous generation and predicated on the fact that the algorithms for generating the keys in the security module and the authorization key generator are identical, in the optimum case, the authorization keys and the security keys should be identical at any given point in time. However, a time shift in the presence of imprecise time synchronization can result in deviations. These deviations can be taken into account by way of certain tolerances by means of a corresponding module inside the system so that certain deviations from the synchronization are accepted. The refreshing of the authorization keys and/or security keys is not limited to a time period of, for example, a minute but can comprise any time period, for example, a second, an hour, a day or any other time period.

The time-based generation of the security key and authorization key can also relate to the period of validity. In particular with regard to the master security key and the master authorization key, it is possible to preset a period of validity of, for example, one day, wherein, after the expiration of the period of validity, the validity of the permanent security key and of the permanent authorization key lapses.

In an embodiment of the present invention, the inputs can, for example, be retrievably deposited in a process memory means in the access control system, wherein the process memory means can, for example, be disposed within the container. The process memory means allows for saving inputs in the security module, or data consignments, as well as any tampering actions. The data can be retrieved from the storage means of the security module and displayed, for example, by means of a display field on the container. It is also possible to query the content of the process memory means via the authorization key supply means and transmit the information to the remote computer system for further evaluation.

In an embodiment of the present invention, presetting of the offline mode and/or online mode can, for example, be achieved by a determination of the quality of the communication between the authorization key supply means and the remote computer system. In this embodiment, an evaluation of the quality of the communication, in particular of the communication connection and/or the data transmission between the authorization key supply means and the remote computer system, is implemented in a targeted fashion in order to generate a decision basis for the offline mode and/or the online mode. The determination of the quality of the communication therein can be achieved via a third-party provider, in particular via a database, which represents information regarding the technical prerequisites for the communication, particularly regarding the quality and availability of the mobile communications network. This database can be subject to regular updating. With the authorization key supply means, and during mobile use, a query regarding the determination of the quality of the communication connection between the authorization key supply means and the remote computer system can furthermore be made. The results of the query can be saved for predetermined time periods, for example, daily, inside the authorization key supply means and made available to the remote computer system in regular intervals. A database that is provided in the remote computer system can thus be updated regularly, so that the remote computer system can preset information regarding the communication feature for a predetermined container.

In an embodiment of the present invention, the quality of the communication between the authorization key supply means and the remote computer system can, for example, be determined in advance, in particular by a preset amount of time prior to use. With this procedure, it can be decided in advance which containers are in connection with the online mode or offline mode, respectively. In this manner, it is in particular possible to decide in advance as to whether authorization keys must be deposited in the storage means of the authorization key supply means or can be made available on location by means of a communication with the remote computer system.

In an embodiment of the present invention, an adaption module can, for example, be provided for creating, saving and updating links of container identification features with a corresponding communication feature, wherein the links can be created and updated, if need be, by actions for determining the quality of the communication between the authorization key supply means and the remote computer system. Using this embodiment, a profile is created essentially for all containers that are in use in the context of the access control system and that prescribes, when the authorization key supply means is used, which of the offline mode and online mode is usable for a predetermined container.

A further aspect of the present invention envisions providing a method for operating an access control system as described above. The method includes the following steps:

Determining the container identification feature that is linked to a stationary container using the mobile authorization key supply means;

Determining the authorization key type that is assigned to the container identification feature.

According to this method, the container identification feature is determined with the aid of the authorization key supply means. Envisioned therein can be a read-in device on the authorization key supply means which is able to read in, for example, a numeric code, an alphanumeric code, or a bar code, and which is attached to the container. Other options are usable as well, such as, for example, the use of a transponder that returns an identification code upon responding to a predetermined signal.

The basic concept that is involved in the method for operating the access control system correspondingly facilitates the selective operation of the authorization key supply means in the online mode or in the offline mode. The security of the access control system is maximized particularly in the online mode therein. In the offline mode, the usability of the system is facilitated unchanged with an acceptable level of security.

In an embodiment of the present invention, the method for operating an access control system can, for example, include the following steps:

Querying the communication feature that is linked to the container identification feature;

Checking the validity of the determined communication feature in the environment of the container;

Saving or transmitting the result of the validity check of the communication feature;

Updating the communication feature, if necessary.

This embodiment provides for updating of the available information with regard to the assignment of the communication features and containers. While the access control system is in use and, in particular, while the authorization key supply means is in use, this system in particular allows for checking as to whether the communication feature that is currently assigned to a container is still valid, in particular, as to whether or not the related container is in an area where the communication is provided between the authorization key supply means and the remote computer system. This determination can be made by checking the quality of the communication link between the authorization key supply means and the remote computer system, in particular by checking, for example, the used mobile communication networks. Due to the constantly changing availability of the mobile communications networks in certain regions, it is thus possible to provide that the suitable mode, namely the online mode or offline mode, is applied during the use of the authorization key supply means.

In an embodiment of the present invention, the method for operating the security control system further can, for example, include the following steps:

Determining the preset of the online mode or offline mode based on the queried communication feature;

Operating the authorization key supply means in the preset mode;

Retrieving the authorization keys that were stored in advance by way of the storage means of the authorization key supply means, when the offline mode is preset; or Transmitting the authorization keys from the remote computer system.

Using the method as described above, the authorization keys, which were stored in advance in the storage means of the authorization key supply means, are used in the offline mode, so that the access control system continues to be usable even if no communication connection is available between the authorization key supply means and the remote computer system. Though tolerating a minimally reduced level of security, the use of the access control system is correspondingly provided. The authorization keys can otherwise be transmitted from the remote computer system, wherein this will maximize the security of the access control system, because the authorization keys are generated in the remote computer system and, if the authorization key supply means is lost, the authorization keys cannot be disclosed to the non-authorized user.

In an embodiment of the present invention, the method for operating the access control system can, for example, include the following steps:

Entering the container identification feature of the container;

Determining as to whether a key that is authorized for one-time-use is available;

Providing the one-time authorization key to the authorization key supply means;

Entering the provided one-time authorization key into the authorization module;

Determining the match between the entered one-time authorization key and the one-time key that is preset by the security key generator;

Releasing the locking means upon establishing a match between the entered one-time authorization key and the one-time key that is preset by the security key generator;

Prohibiting any release of the locking means by means of any other authorization keys, until the locking means was released by the entered one-time authorization key.

This embodiment utilizes a one-time authorization key whose property is different from the general authorization keys. The one-time authorization key is in particular provided in order to be able to securely deposit consignments, in particular return shipments, that are to be received by the provider of the delivery service, inside the container. In the present embodiment, this is achieved in that the consignment is deposited inside the container by the owner of the container, a one-time key is preset, for example, entered manually or queried from the authorization module of the security module, and supplied directly or indirectly to the provider of the delivery service. In the present embodiment, following the locking action of the locking means and while the consignment is inside the container, any release of the locking means is only possible when the one-time authorization key is entered or supplied. After the locking means has been locked and when presetting a one-time key by means of a correspondingly module, any inadvertent granting of access to the content of the container by the use of other keys is in particular prohibited during any parallel use of the delivery control system.

In an embodiment of the present invention, the method for operating the access control system can, for example, include the following steps:

Entering a permanent authorization key into the authorization module;

Determining the match between the entered permanent authorization key and of the permanent key that is preset by the security key generator;

Determining as to whether the locking means has been locked by a one-time authorization key;

Releasing the locking means if a match is found between the entered permanent authorization key and of the permanent key that is preset by the security key generator;

Prohibiting any release of the locking means if it is determined that the locking means has been locked by a one-time authorization key.

The permanent authorization key that is used in the present embodiment differs from the general authorization keys. The permanent authorization key is designed to facilitate access to the inside of the containers at any point in time or at a point in time that can be preset. The permanent authorization key can, for example, be unchangeable and corresponds over the total period of validity thereof to the permanent authorization key that is preset by the authorization module of the security module. The option is thereby provided that the permanent authorization key can be forwarded to other persons who are not the owner in order to allow other persons access to the interior of the container as well, if necessary. The permanent authorization key and/or the permanent security key does/do not need to be provided with an indeterminate period of validity. The validity can instead be restricted to a predetermined time period. It is also possible to limit the usability of the permanent authorization key and/or the permanent security key to certain temporal ranges, for example, certain time windows during the day or on predetermined weekdays.

In an embodiment of the present invention, the method for operating the access control system can, for example, include the following steps:

Entering a master authorization key into the authorization module;

Determining the match between the master authorization key and the master key that is preset by the security key generator;

Determining the load state of the container;

Releasing the locking means if a match is found between the entered master authorization key and the master key that has been preset by the security key generator;

Prohibiting any release of the locking means, if it is determined that the container is loaded.

With this function of the master authorization key and/or the master security key, it is possible to grant access to the interior of the container to a predetermined community of users, providing that the container is empty and that, consequently, any risk is thus precluded that any material damage may occur from the removal of consignments from the interior. The determination as to whether the container is empty can be obtained by establishing a match with information deposited in the database inside the remote computer system. Due to the fact that the consignment traffic can, for example, be detected and deposited in the database while the access control system is in use, the remote computer system is able to evaluate, based on the available information, as to whether a consignment is located inside the container or not. For example, the provider of the delivery service can deposit a consignment inside the container, thereby causing the container to be locked with the locking means. Using the authorization key supply means, the remote computer system can then be notified that the consignment was deposited inside the container and that the container was locked by the locking means. As long as the owner of the container has not removed the consignment from the interior of the container, it is determined that the container is loaded. This knowledge is available to the security module because, in order for a consignment to be removed, a key must be indicated, in particular an authorization key, in order to gain access to the interior of the container. It is sufficient, however, for the information regarding the load state of the container to be available to the authorization module and that the authorization module arrives at this determination in a stand-alone fashion.

This embodiment provides that a certain community of persons has continuous access to the container, while the security of the access control system is still maximized.

In an embodiment of the present invention, the method for operating the access control system can, for example, include the following steps:

Determining as to whether the locking means is locked by a one-time authorization key;

Prohibiting any release of the locking means in the event that it is determined that the locking means has been locked by means of a one-time authorization key.

With this embodiment, it is provided for all further types of keys that only the user of the one-time authorization key will have access to the container. The security of the access control system has thereby been further improved.

In an embodiment of the present invention, the method for operating the access control system can, for example, include the following steps:

Predetermining an operational profile of the access control system, wherein the operational profile comprises the use of a number of containers with correspondingly linked communication features within a preset time period with an assigned authorization key supply means;

Wherein a data match for the assigned authorization key supply means is implemented for the utilization with the predetermined operational profile comprising as follows:

Detecting a set of communication features that preset the offline mode, of containers that are to be usable within the preset time period of the operational profile;

Retrieving those authorization keys that are linked to the communication features presetting the offline mode prior to any use with the predetermined operational profile, and saving the authorization keys in the authorization key supply means;

Providing the authorization key from the storage means of the authorization key supply means by entering the corresponding container identification feature in the authorization key supply means.

This embodiment further improves the usability of the access control system, while, taking into account any technical possibilities, optimizing security. The operational profile of the access control system comprises, in this context, spatial and temporal uses. The operational profile in particular detects a number of containers that are to be served by the provider of the delivery service. The temporal component further comprises a time period during which the previously specified containers of the operational profile are to be served. By way of a concrete example, the containers that are served during any given day can be combined into an operational profile. It is in particular possible to set up the operational profile as a temporally repeating profile with a specification of the containers and that essentially remains unchanged.

Due to the fact that the operational profiles are in practice regularly known in advance, based on data matching, it is possible to obtain information from the remote computer system that allows for the in-advance filing of those authorization keys in the authorization key supply means for which the offline mode is available. Those authorization keys, which are provided for containers of the operational profile and which have the online mode envisioned therein, can be generated and assigned on location by entering the container identification feature.

In an embodiment of the present invention, the method for operating the access control system can, for example, include the following steps:

Detecting a set of communication features that preset the online mode;

Detecting containers that are to be usable within the preset time period of the operational profile;

Transmitting those authorization keys that are linked to the communication features, which preset the online mode following the input of the container identification feature from the remote computer system to the authorization supply means.

In an embodiment, the present invention provides an access control system, in the context of which the selective assignment of online mode and offline mode is not essential, with the following elements:

A plurality of stationary containers each of which includes a locking means that can be selectively released for allowing access to the interior of the respective container, and wherein each of the stationary containers has assigned thereto a container identification feature;

A stationary security module within the respective container that includes a security key generator and an authorization module;

A mobile authorization key supply means with a storage means and a communication module for directly or indirectly supplying authorization keys to the authorization module;

Wherein a security feature can be preset for the authorization key supply means for at least one of the authorization keys;

Wherein the authorization module is set up to compare preset security keys with supplied security keys, and in that the, if need be, preset security feature in the security keys is detected, when the same is supplied to the authorization module, and wherein, when the authorization module finds a match between a preset security key and a supplied authorization key, a signal for releasing the locking means can be generated;

Wherein the authorization module, when the security feature is detected in a supplied authorization key, sets the same as currently valid authorization key and allows a signal for releasing the locking means only to be generated if the currently valid authorization key is supplied to the authorization module, and which is predicated on the match with the preset security key as established by the authorization module.

In an embodiment of the present invention, the authorization module allows the generating the signal for releasing the locking means, when authorization keys are supplied to the authorization module that do not correspond to the currently valid authorization key, only following the at least one-time supply of the currently valid authorization key after the detection of the security feature.

In an embodiment of the present invention, the authorization module sets, if it detects that the security feature is not present in a supplied authorization key, the same as the general authorization key and allows the generating of the signal for releasing the locking means with the subsequent supply of deviating authorization keys, which is predicated on the match the authorization module found with the preset security key.

The present invention will be described below under reference to an embodiment of the access control system. The embodiment is only of an exemplary nature and not intended to limit the subject-matter of the present invention as set forth therein and protected by the claims in any way.

FIG. 1 shows a container 1 that is configured as a block-shaped or cube-shaped box and provided with a door 4 on one side thereof. The door 4 is pivotably fastened to the container 1. The dimensions and the shape of the container are not important for the fundamental concept of the present invention. The volume of the interior of the container 1 is arranged so that an item, for example a consignment of predetermined dimensions, can be accommodated therein.

A locking means 3 is provided on the container 1. The locking means 3 has the function of locking the door 4 so that the door 4 cannot be opened when it is in the locked state. The door can, however, be opened when it is in the released state. The locking means 3 can be designed as a magnetic lock, an electromotorically powered lock, or the like. The specific design of the locking means 3 is not important. The locking means 3 should, however, be switchable between a locked and a released/unlocked state by means of a signal.

In the example as shown in FIG. 1, the container 1 features a keypad 5 that is affixed on the outside area of the door 4 in the present embodiment. The location where the keypad 5 is positioned is not, however, important as long as the user is able to operate the keypad. Also provided is a display 5a where alphanumeric information can be displayed. The display 5a is not limited to a specified design.

In the example as shown in FIG. 1, the container 1 also includes a container identification feature 1a which is configured as a bar code in the shown example. The container identification feature 1a, which is configured as a bar code, contains coded information that can be used to identify the container. The assignment of the container identification feature 1a for the corresponding containers 1, as used in context of the access control system, does not have to be unique. Further characterizing features, such as, for example, location and the like, can be included in the identifying process, in addition to the container identification feature 1a.

A security module 2 is housed inside the container 1. In the present embodiment, the security module 2 includes at least one integrated circuit and a storage means. The security module 2 is also designed to communicate with the keypad 5 and the display 5a. The security module 2 furthermore comprises an authorization module that is functionally integrated with the security module.

The authorization module, which is a component of the security module 2, is able to output a signal to the locking means 3 to trigger a locking or releasing of the locking means 3. Said signal can include, for example, a control voltage that triggers a magnetic or an electromotoric mechanism in the locking means 3 so that the locked and released state of the locking means 3 can be achieved.

The security module 2 is accommodated inside the container so that, when the locking means 3 is locked, all access to the security module 2 is precluded. The security module 2 can also be accommodated inside a housing that is additionally sealed with an artificial resin or the like. The security module 2 can, for example, be designed so that, in the event of a tampering event, the security module 2 is destroyed so that access to any data contained therein is precluded.

The container 1 is designed as a stationary unit. It is possible to attach the container 1 to a stationary element, for example, to a building wall or foundation. The fastening means can, for example, be designed so that any removal of the container 1 from the stationary element is impossible when the locking means 3 is locked. In the best case scenario, any removal of the container 1 from the stationary element is completely precluded.

The container 1 as shown in FIG. 1 is assigned to an address, in particular to a mailing address. The container 1 can therefore be understood as a kind of mail box that is assigned to a street address.

The container 1 further includes a communication module 6 that can stand in a data exchange with the security module 2. The communications module 6 can create a communication with different devices. The communication can be produced, for example, as a wireless connection. Any other communications option is, however, possible as well.

Figure 2:
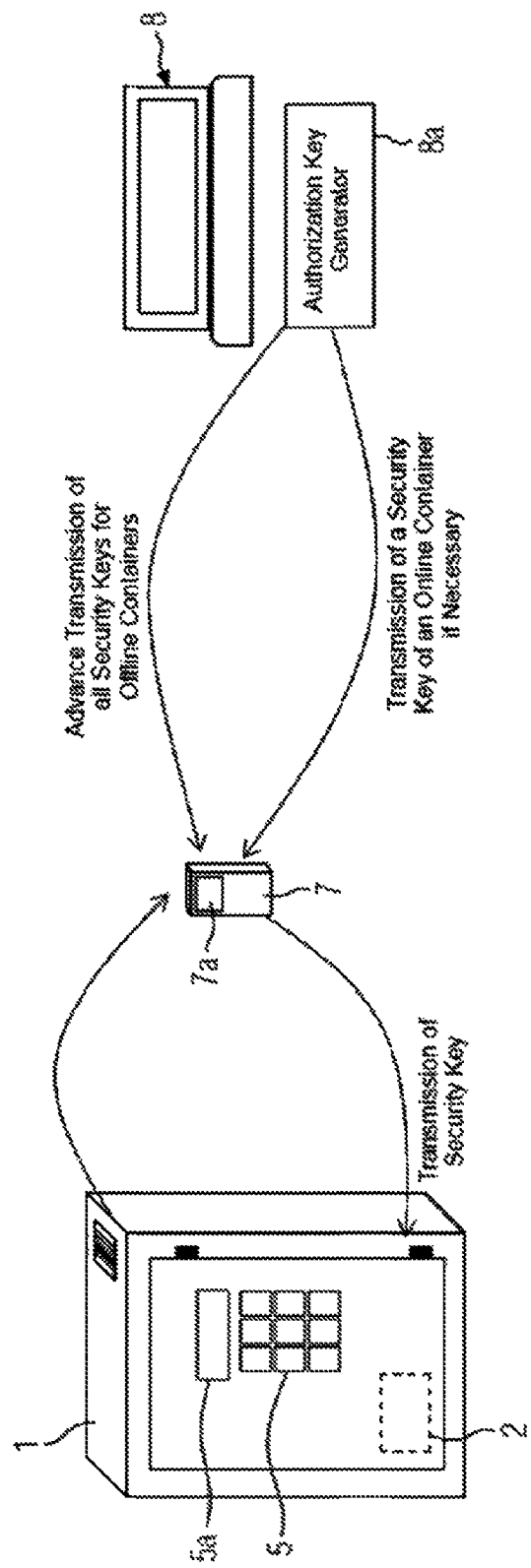
FIG. 2 shows elements of the access control system.

FIG. 2 shows components of the access control system in the context of an embodiment. The container 1 corresponds to the container as shown in FIG. 1. An authorization key supply means 7 is provided as a further element of the access control system. The authorization key supply means 7 is designed as a handheld device that is, in particular, portable and mobile. The authorization key supply means 7 includes, inter alia, a display 7a. Further elements of the authorization key supply means 7 comprise a bar code scanner, a keyboard for entering data or information, a communication module for wireless communication, in particular with the communication module 6 of the container 1, and a mobile communication module.

A remote computer system 8 is depicted as a further element of the access control system in FIG. 2. The remote computer system 8 is designed as a PC, however, the use of any other kind of computer system is possible. The remote computer system 8 can, in particular, be integrated as part of a network. It can be connected to the internet in the special application. Other network types are not, however, precluded. The remote computer system 8 comprises an authorization key generator 8a.

The functionality of the authorization key supply means 7 will be explained below. The authorization key supply means 7 includes a mobile communications module that can be used to establish a connection with the remote computer system 8. The mobile communications module of the authorization key supply means 7 is in particular set up to allow for a data exchange with the remote computer system 8 via a network connection. While the use of a secured internet connection is possible, any other connection outside of the internet is conceivable.

The mobile communications module of the authorization key supply means 7 uses telecommunications cells that are publically available. The publicly available mobile telecommunications cells are not uniformly functional across a territory and are subject either to considerable limitations in terms of their performance in the transmission of data or not available at all in certain regions. This availability issue affects, in particular, rural geographic regions, while network coverage in urban areas is almost complete (100%).

The authorization key supply means 7 includes a storage means where data supplied to the authorization key access means 7 can be deposited. These data can comprise data that are entered by means of the keypad, data that are transmitted via the mobile communications module, and data that are transmitted via the communication module 6 of the container 1. The authorization key supply means can also have a GPS module to detect the current position or the movement profile of the authorization key supply means.

The encryption technology that is used in conjunction with the access control system will be explained below. The security module 2 within the container 1 comprises one module for generating the keys. Keys are generated in correspondence with a predetermined algorithm. The authorization module of the security module 2 can receive authorization keys that were entered, for example, via the keypad 5 and compare with the generated key. If the key that is preset in the security module 2 is identical to the entered authorization key, the authorization module outputs a signal to release the locking means 3.

In the above-captioned simplest case scenario, the key, which is generated in the security module 2, is a static key, and the authorization key that is entered in the keypad is also static and/or unchangeable, wherefore, in this shown simplest case scenario, there is an electronically supported number lock that allows gaining access to the interior of the container 1, provided the static authorization key is known.

The present access control system is, however, used with a plurality of containers 1 and, typically, also with a plurality of authorization key supply means 7. The present access control system is particularly set up for a provider of delivery services.

Figure 3:
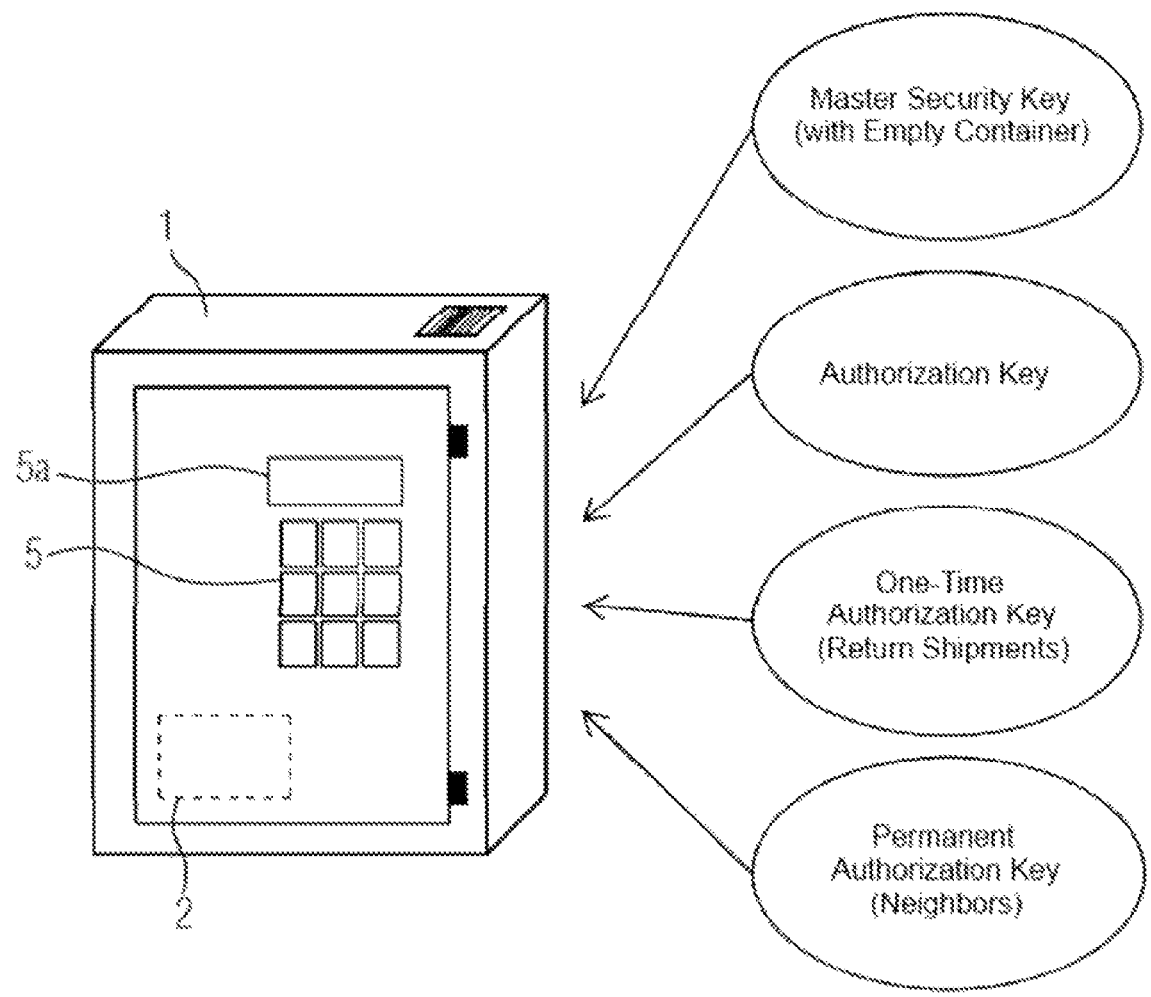
FIG. 3 is a representation for illustrating different types of keys.

The types of keys that are available for the present embodiment are indicated in FIG. 3. The list is not final, and other types of keys can be used as alternative or cumulative options in conjunction with the access control system according to the present invention. The generation, further processing, and handling of the different keys occurs in associated modules that are set up within the hardware of the access control system.

Master Security Key

A master security key is made available for providing the option to the provider of delivery services. This master security key is known to the provider of the delivery services. It can be a static key. The master security key can, for example, be provided with a limited period of validity, such as, for example, a validity period of one day. The master security key can be preset in the security module 2 and can be compared with the assistance of the authorization module, to a master authorization key that was entered. If a match is found, the authorization module outputs a signal for releasing the locking means 3, so that accessing the interior of the container 1 is rendered possible. The aforementioned is predicated on a determination, however, that the load state of the container yields a finding of empty. The load state is determined with the aid of information that is available during the use of the access control system and that is exchanged within the access control system. In particular, with the assistance of the authorization key supply means 7, the deposit of a consignment in the container 1 is entered as an informational item. The loading state of the container 1 is thus known insofar as that a consignment is indeed located in container 1, and that the container 1 is therefore loaded.

If the container 1 is opened, due to the input of an authorization key by the user or by an authorized person, the consignment will presumably be removed from the container 1. The informational item is correspondingly deposited in the security module 2, in particular in the storage means that is provided therein, that the consignment was removed and that the container 1 is therefore now empty. In this regard, the security module 2 has knowledge as to the load state of the container 1, and it is able to make this information available to the authorization module in order to decide as to whether or not the master authorization key results in the output of a signal that triggers a releasing of the locking means 3. In fact, when the information that a consignment is located in the container 1 is available to the authorization module 2, the input will not result in the output of a signal triggering the release of the locking means 3. This function facilitates granting access to the interior of the container 1, provided the container is empty and any unauthorized removal of consignments is improbable.

Authorization Key

General authorization keys are utilized in the context of the use of the access control system. In particular, authorization keys can be supplied to the authorization module 2, which compares the security key that is preset by the security module 2 with the supplied authorization key. If a match is found, the authorization module of the security module 2 outputs a signal triggering a release of the locking means, so as to give access to the interior of the container 1. In the present embodiment, the authorization key is configured as a non-static key and is periodically refreshed according to a predetermined algorithm. The security key that is preset by the security module 2 is also non-static and is periodically refreshed based on the same algorithm and with the same time basis. The time basis therein can comprise 60 seconds, 10 minutes or any other time period, so that a sufficient level of security is provided.

Entering the authorization key will not, however, unconditionally result in the output of the signal that will trigger the release of the locking means 3, even if a match with the preset security key is found, as described in further detail below.

The authorization key can also have a security feature. The security feature is provided during the generation of the authorization key in the remote computer system 8 and is added to the authorization key. The security feature can consist of one bit that is placed, for example, when the security feature is present. Other possibilities envision configuring the security feature as an element of the key that can be calculated. In any case, the security feature is detectable by the authorization module of the security module 2, so that the authorization module is able to determine, upon an authorization key being entered, as to whether the authorization key includes a security feature or not.

The security feature and the determination as to the presence of the security feature when supplying an authorization key has the purpose of restricting the output of the signal for releasing the locking means 3, as described below.

The access control system of the present embodiment is usable for the parallel utilization by multiple providers of the delivery service. Each provider therein uses the same set of containers 1 with the same hardware. Each provider moreover uses an authorization key supply means that is equipped with the presently described functions. The remote computer system 8 can be used uniformly by all providers. Each provider can alternatively operate his own remote computer system 8, provided there is a possibility for data exchanges between the remote computer systems 8.

Each provider of the delivery service can utilize the functionality of the access control system. Since this is the case, there exists the possibility that a consignment was deposited by one provider of the delivery service inside the container 1 and that, prior to the removal of this consignment by the owner, a further provider of the delivery service intends to deposit a further consignment inside the container 1. To prevent, especially in connection with consignments of a material or other type of value that is above average and any loss of which would constitute considerable damage, any unauthorized removal by an employee of the provider of the delivery service, for such deliveries, it is therefore possible to add the above-described security feature to the authorization key, when such consignments of value are delivered.

Upon the supply of the authorization key, the authorization module of the security module 2 is able to determine as to whether a security feature is available for said authorization key or not by evaluating the content of the key. If the authorization module determines that the supplied authorization key contains a security feature, following the deposit of the consignment inside the container and the closing of the door, any re-opening of the container and access to the interior thereof is only allowed following the release of the locking means 3 when the owner or an authorized person removes the consignment of value from the container 1. In fact, the authorization module contains a specific module by means of which any generation of a signal for the release of the locking means 3 is prohibited until the locking means is released by the owner of the container 1 for the purpose of removing the consignment of value. Said release action can be achieved by entering the same authorization key or a permanent authorization key that is known as a status key only to the owner or authorized person, and which grants unlimited access to the interior of the container 1. The permanent authorization key will be described in further detail below.

One-Time Authorization Key

If the owner of the container 1 deposits a consignment inside the container 1 accompanied by the request directed at the provider of the delivery service for a pick-up of said consignment as a return consignment or the like, it is possible to provide a one-time authorization key that is communicated to the provider of the delivery service. The one-time authorization key therein can be generated by a corresponding query on the part of the security module 2 or preset by a corresponding input into, for example, the keypad 5. After the container 1 is locked and the one-time authorization key is preset or generated, the signal for releasing the locking means 3 is prohibited by the authorization module of the security module 2 in order to thereby prevent any unauthorized removal of the consignment by other authorization keys that, while though they are valid, deviate. To this end, the authorization module of the security module 2 includes a module by which the generation of the signal for the release of the locking means 3 can only be initiated by giving out or generating the one-time authorization key and, following the locking action of the container 1. Any other authorization keys that are supplied to the authorization module, prior to supplying said one-time authorization key, are rejected and fail to initiate the generation of a signal for releasing the locking means 3.

As soon as, for example, the provider of the delivery service has supplied the one-time authorization key to the authorization module, the signal for releasing the locking means 3 is generated, making it possible to open the door to the container 1 and to make available the consignment, such as, for example, a return consignment to the provider of the delivery service. The authorization module of the security module 2 recognizes this process and lifts the limitation for authorization keys that deviate from the one-time authorization key. The container 1 can thus be used once again for other authorization keys.

Delivery of the one-time authorization key that is generated by the security module 2 following a corresponding request by the owner or that is preset by the owner himself can be supplied in any which way to the provider of the delivery service, for example, via an online portal, by phone or by mail Permanent Authorization Key A permanent authorization key is available to the owner for owner's own use of the access control system and for the transfer of the access rights to authorized persons. Said permanent authorization key is configured as a static key. The permanent key that is preset or that can be preset in the authorization module of the security module 2 is also configured as a static key. The owner of the container 1 is therefore able to hand the permanent authorization key, for example, to neighbors or to other authorized persons so that they can remove consignments deposited inside the container 1 on behalf of the owner. There exists the possibility of assigning certain restrictions to the permanent authorization key, such as, for example, a time limit whereby the permanent authorization key is only valid at certain times of the day or on certain days of the week. Such preset provisions can be entered, for example, directly into the keypad 5 of the container 1.

Figure 4:
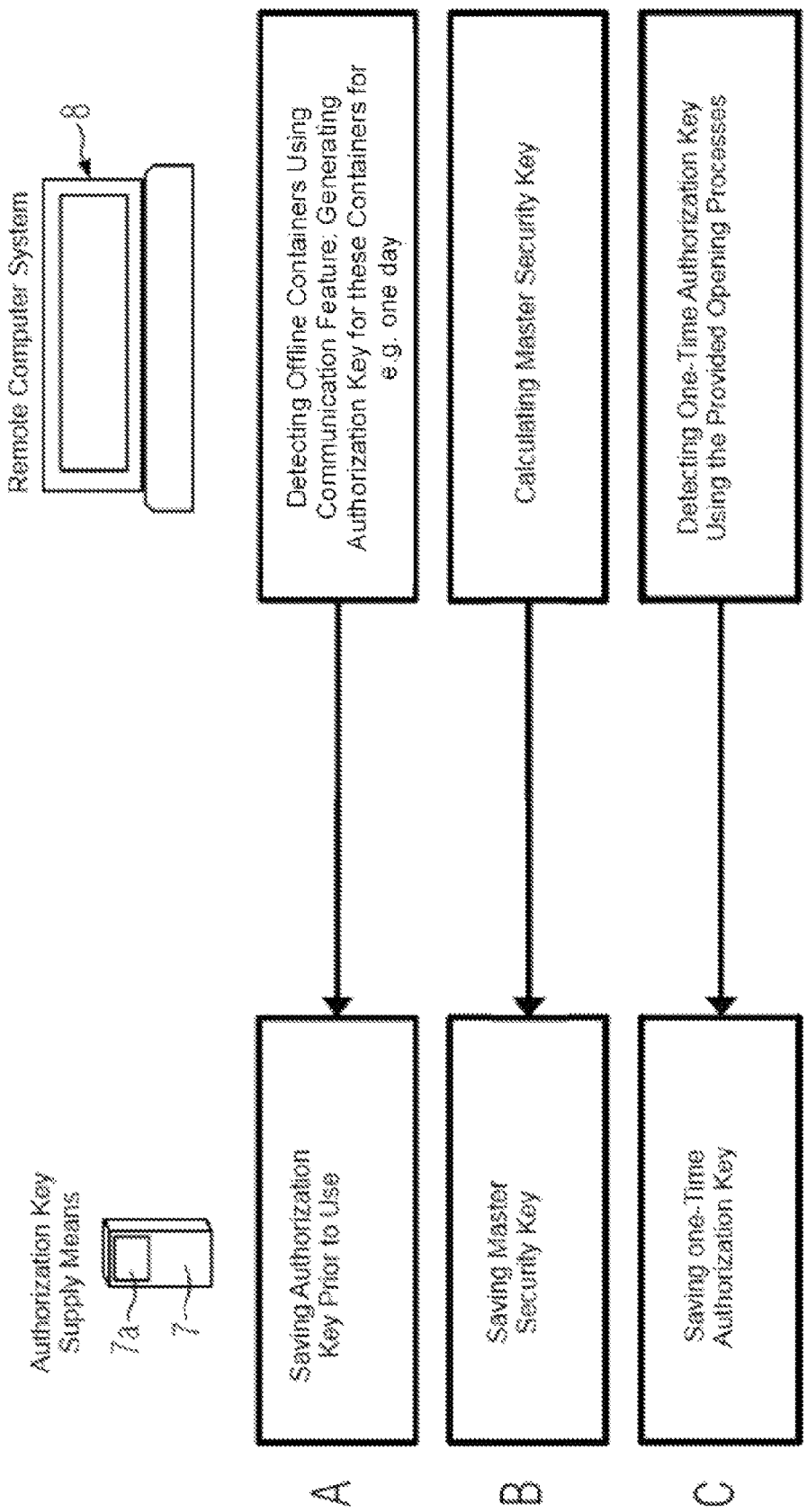
FIG. 4 is a representation for illustrating different types of uses of the access control system.

FIG. 4 shows the functionality of the access control system in an exemplary fashion, in particular the functions that are assigned to the authorization key supply means 7 and the remote computer system 8. FIG. 4 therein demonstrates, in particular, the saving of information in the authorization key supply means as it occurs prior to the outset of the employee's delivery round. A flow chart of the use of the access control system according to the embodiment is also depicted in a simplified manner in FIG. 5.

The access control system is in particular usable for providers of delivery services that usually come with a predetermined operational profile that is known in advance, such as, for example, those containers 1, that are served in the course of one day by an employee of the provider. The remote computer system 8 typically has advance knowledge as to which containers 1 are to be served, as shown in section A in FIG. 4. Prior to entering the operational profile, the remote computer system 8 detects the communication features that are respectively assigned to the container 1. The communication features contain information regarding the possibility of creating, at the location of the container 1, a communications connection between the authorization key supply means and the remote computer system 8. Correspondingly, with the aid of the communication feature, a differentiation is made as to whether a predetermined container 1 of the operational profile has the online mode or the offline mode preset thereon. If it is determined that a predetermined container 1 is at a location without availability of, for example, a mobile communications network, the communication feature for offline operation is preset. On the other hand, for those containers 1 that are located in areas where a mobile communications connection is available, the communication feature of the online mode is preset.

Prior to entering the predetermined operational profile, in particular, prior to the outset of the delivery tour by the employee of the provider of the delivery service, any necessary data from the remote computer system 8 are deposited in the storage means of the authorization key supply means. For the containers 1 therein with a preset online mode, no authorization keys are stored in the storage means of the authorization key supply means 7. For those containers 1 with a preset offline mode, the needed authorization keys are deposited in the storage means of the authorization key supply means.

If the system is used on the basis of the preset operational profile, the containers 1 that are associated with the operational profile are served and consignments are deposited in the corresponding containers 1, if necessary. A reader of the authorization key supply means 7 for reading in the container identification feature 1*a* is used therefor. In the present embodiment, a bar code is read in as container identification feature 1*a*, and an authorization key becomes subsequently available on the authorization key supply means 7.

If the communications feature that is assigned to the corresponding container 1 presets the offline mode, the authorization key is taken from the storage means of the authorization key supply means 7. In case that the related container 1 has a communication feature assigned to it that presets the online mode, the authorization key is generated on the remote computer system 8 upon request by the authorization key supply means and made available thereon.

It is in particular possible for the authorization key to be displayed in the online mode as well as in offline mode on the display 7*a* of the authorization key supply means 7 so that this authorization key can be entered into the keypad 5 of the container 1. Alternately, using a wireless connection, it is also possible to envision a data transfer from the authorization key supply means 7 and the container 1, particularly the security module 2.

The master security key that allows the provider of the delivery service access to the interior of the container 1, provided it has been determined that the container 1 is empty, can be made available with equal differentiation for the online mode and offline mode relative to the authorization key supply means as shown in section B of FIG. 4. The containers 1, for which the online mode is preset, can be opened by means of the master authorization key that is supplied to the authorization key supply means 7 upon request by the remote computer system 8. Those master authorization keys that are to be used for the containers 1, and which have the offline mode assigned to them, are stored in advance in the storage means of the authorization key supply means 7.

A one-time authorization key, as described above and depicted in section C of FIG. 4, is preset by the owner of the container 1 and supplied to the provider of the delivery service. The differentiation between the online mode and offline mode can be achieved in the same manner in this case, so that those one-time authorization keys, which are assigned to the containers 1 and for which the offline mode is preset, are stored in advance, while those one-time authorization keys, which are assigned to the containers 1 and for which the online mode is preset, are supplied to the authorization key supply means upon a corresponding request.

A system is therefore provided that maximizes the security overall with an available online mode, because, in this case, an authorization key is not stored in the authorization key delivery means 7. Correspondingly, any loss of the authorization key supply means 7 would not result in unauthorized persons being given access to the interior of the container 1. To provide the usability of the system across territories, it is furthermore possible that authorization keys be deposited in advance only for those containers with a preset offline mode. A territorial operational usability with differentiated and optimized security characteristic is therefore provided.

Figure 5:
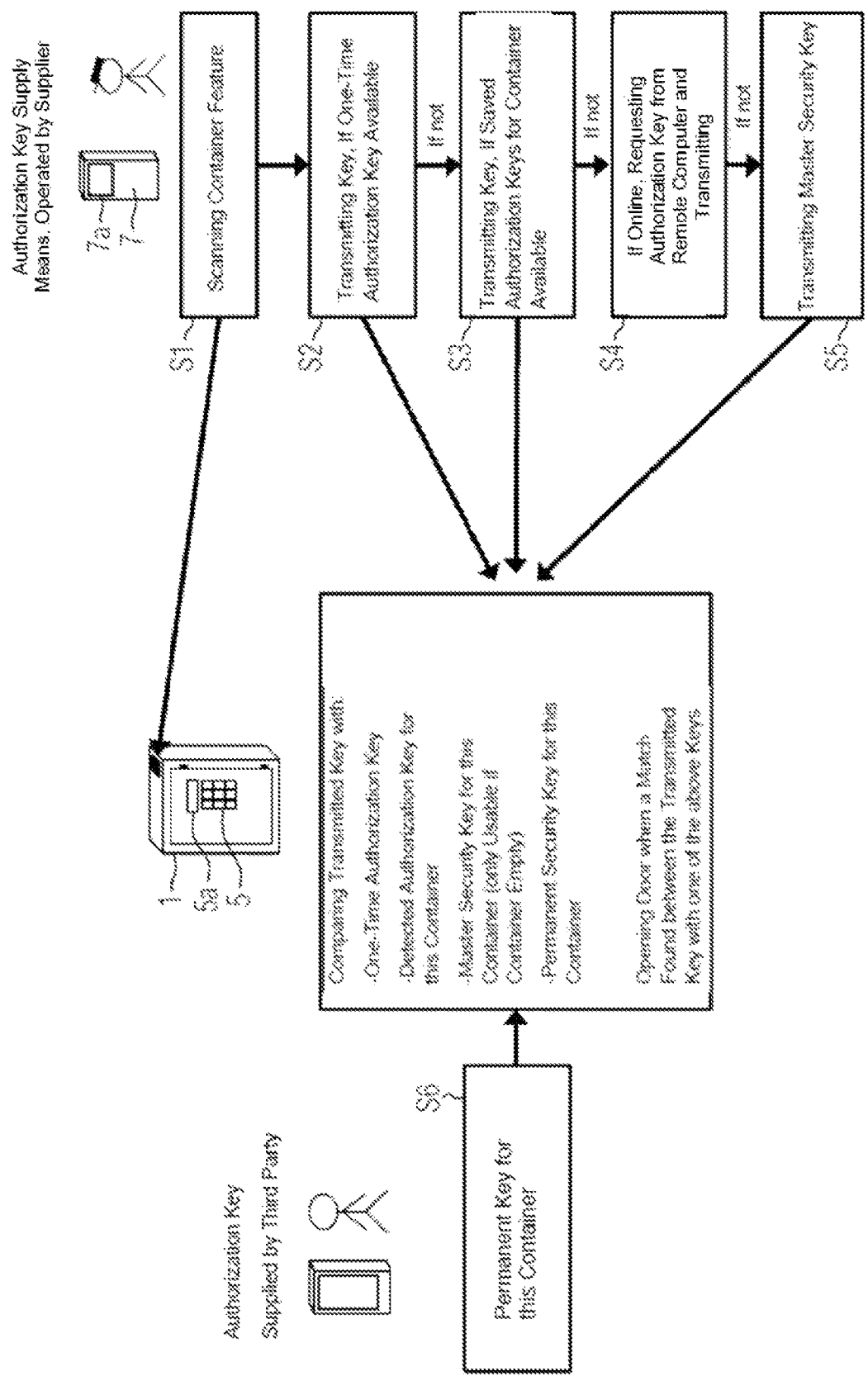
FIG. 5 shows a simplified process flow of operational use of the access control system.

The flow of the operational use of the access control system is demonstrated below according to the embodiment in FIG. 5. More specifically, the description sets forth the authorization flow on a stationary container 1.

The authorization can be given by an employee of the delivery service or by a third party. The steps S1 to S5 as depicted in FIG. 4 demonstrate the authorization flow therein in the manner as the same occurs, when the employee intends to open the container using the authorization key supply means. Step S6 shows an authorization by a third party given to the container 1.

When the employee reaches a container in the context of a preset route, said employee first reads the container feature into the authorization key supply means. According to step S1, the container feature is scanned with the authorization key supply means 7, for example a bar code.

In step S2, the authorization key delivery means 7 checks as to whether a one-time authorization key is stored in the authorization key supply means 7 for the container 1. If this is the case, the authorization key supply means 7 transmits the stored one-time authorization key, respectively, to the container 1 or to the security module 2 that is contained in the container 1. The door of the container is released, if the transmitted one-time authorization key matches the deposited one-time authorization key.

However, if step S2 detects that no one-time authorization key is stored for the container in the authorization delivery means, a check is run in the subsequent step S3 to determine as to whether an authorization key is stored for the container in the authorization key supply means 7. If such an authorization key was deposited, the same is transmitted to the security module 2, and the door of the container is released if the authorization key matches the detected authorization key for this container 1. Step S2 therefore checks as to whether an authorization key has been stored previously in the authorization key supply means, meaning that the same is available offline.

However, if it is found in step S3 that no authorization key was saved for the container, an authorization key is requested in a subsequent step S4, via online access to the remote computer system, which is then transmitted to the security module 2, after it has been received. The door of the container 1 is released if the transmitted authorization key matches the detected authorization key for this container 1. However, if no authorization key can be obtained from the remote computer system, the process flow continues with step S5.

In step S5, the master authorization key that is stored in the authorization key supply means 7 is transmitted, respectively, to the container 1 or the security module 2 thereof. The door of the container 1 is released, if the transmitted master authorization key matches the master security key detected for the container. However, this only occurs if the container is empty.

After the container has been successfully opened, the employee deposits the item that is to be delivered, then relocks the container. The container 1 can now be opened and the content thereof can be removed by any third party using a matching permanent authorization key for this container 1.

A modification of the previously described embodiment provides that the authorization key supply means can be configured so that it is able to preset a security feature for at least one of the authorization keys. The authorization module can in that case be set up accordingly for a comparison of the preset security keys with the supplied authorization keys and to detect the, if need be, preset security feature in the supplied authorization keys, when they are delivered to an authorization module. If a security feature is recognized, the supplied authorization key can be set as the currently valid authorization key. The generation of the signal for releasing the locking means is only allowed provided the currently valid authorization key to the authorization module matches the preset security key.

When authorization keys are supplied to the authorization module that are not a current match for the valid authorization key, the authorization module cannot permit the generation of the signal for releasing the locking means until the currently valid authorization keys has been supplied at least once following the detection of the security feature.

Should it moreover be detected that the security feature is not present in the supplied authorization key, the authorization module can set the same as a general authorization key and can allow the signal for releasing the locking means to be generated, when subsequently deviating authorization keys are supplied, provided there is a match as determined by the authorization module with the present security key.

Using the previously described modification, it is possible to safely operate the access control system even without a selective assignment of the online mode and offline mode.

The present invention is not limited to embodiments described herein; reference should be had to the appended claims.

LIST OF REFERENCE NUMERALS

1 Container
1a Identification feature
2 Security module
3 Locking means
4 Door
5 Keypad
5a Display
6 Communication module
7 Authorization key supply means
7a Display
8 Computer system
8a Authorization key generator

What is claimed is:
1. An access control system comprising:
a plurality of stationary containers, each stationary container comprising,
a container identification feature,
an interior space,
a locking device which is selectively releasable to facilitate an access to the interior space, and
a stationary security module arranged inside the stationary container, the stationary security module comprising at least one integrated circuit, an authorization module, and a security key generator configured to generate a security key;
a mobile authorization key supply device comprising a storage device and a communication interface, the communication interface being configured to directly or indirectly supply an authorization key to the authorization module;

a remote computer system comprising an authorization key generator, the remote computer system being configured to communicate with the mobile authorization key supply device so as to transmit the authorization key to the mobile authorization key supply device;

a one-time key configured to be preset for the security key generator;

a one-time authorization key;

a permanent key preset for the security key generator;

a supplied permanent authorization key;

a module configured to determine a loading state of the stationary container;

a master security key; and a master authorization key configured to be preset, wherein, the authorization module is configured, to compare the security key with the authorization key and to generate a signal to release the locking device if a match between the security key and the authorization key is determined, to compare the one-time key with the one-time authorization key and to generate a signal to release the locking device if a match between the one-time key and the one-time authorization key is determined, to compare the permanent key to the supplied permanent authorization key, and, if a match between the permanent key and the supplied permanent authorization key is determined to exist and if the authorization module determines that the locking device is not locked by the one-time authorization key, to generate a signal to release the locking device, and to compare the master authorization key to the master security key, and to generate a signal to release the locking device if a match between the master authorization key and the master security key is determined and if the module determines that the stationary container is not loaded, the mobile authorization key supply device is configured to be operated in an online mode where a communication between the authorization key supply device and the remote computer system is presumed ensured, and an offline mode where the communication between the authorization key supply device and the remote computer system is not ensured, and a communication feature is linked to each container identification feature, the container identification feature linked to the stationary container being determined using the mobile authorization key supply device, and the authorization key that is assigned to the container identification feature being queried, the communication feature being configured to selectively preset the online mode or the offline mode for the stationary container which corresponds to the container identification feature.

2. The access control system as recited in claim 1, wherein the authorization key is linked to the container identification feature which presets the offline mode as the communication feature, is deposited in advance in the storage device, and is retrievable from the storage device when the container identification feature is entered.

3. The access control system as recited in claim 1, wherein the authorization key is linked to the container identification feature which presents the offline mode as the communication feature, and is transmitted from the remote computer system to the mobile authorization key supply device when the container identification feature is entered.

4. The access control system as recited in claim 1, wherein the authorization key and the security key are generated on a time basis.

5. The access control system as recited in claim 1, wherein the assigning of the offline mode and/or the online mode occurs based on a determination of a quality of the communication between the mobile authorization key supply device and the remote computer system.

6. The access control system as recited in claim 5, wherein the determination of the quality of the communication between the mobile authorization key supply device and the remote computer system occurs at a predetermined time prior to a use of the access control system.

* * * * *